Oct. 31, 1939.     A. L. HANSEN     2,177,826
DOOR HINGE
Filed April 23, 1938
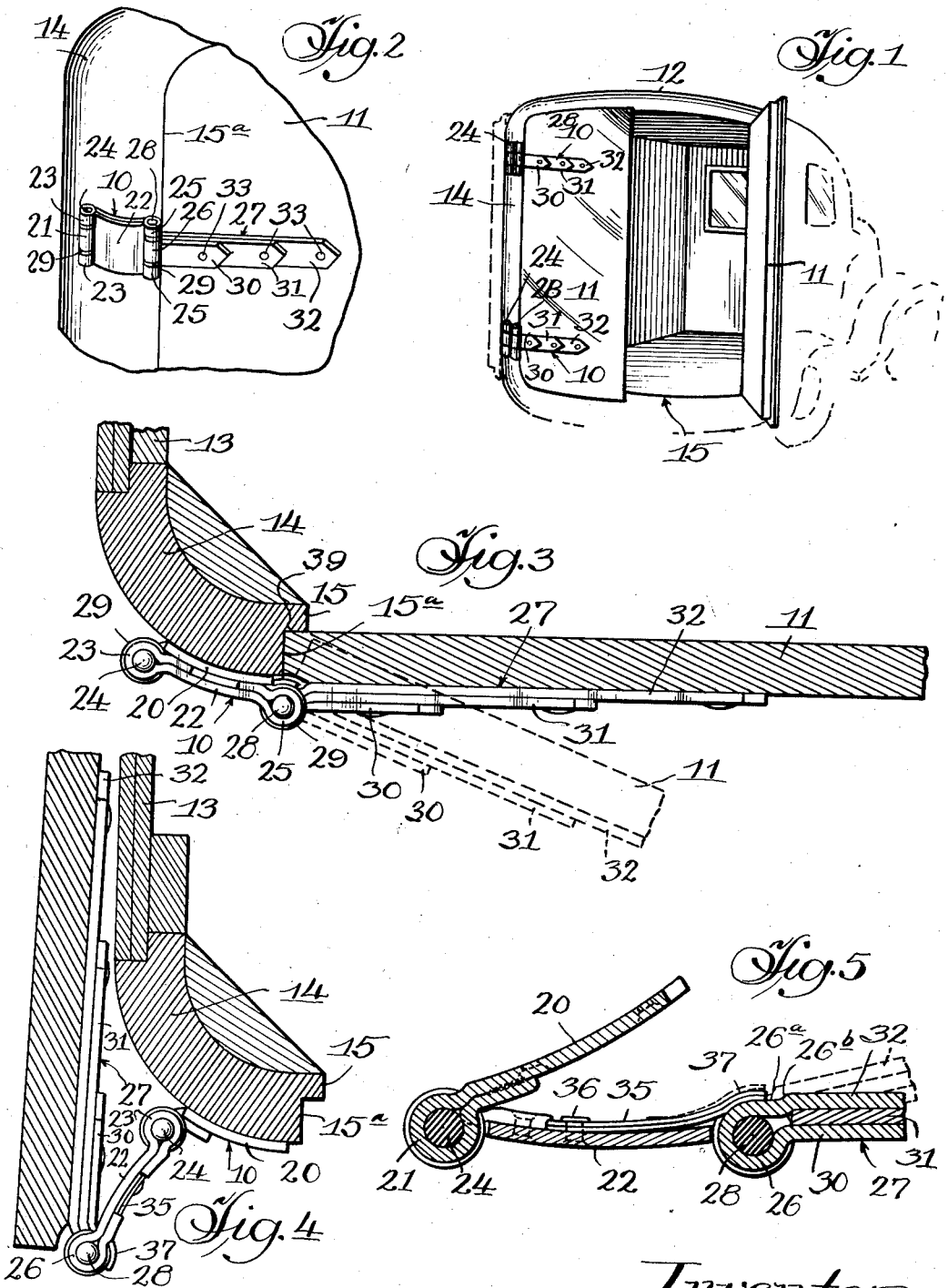

Patented Oct. 31, 1939

2,177,826

UNITED STATES PATENT OFFICE 2,177,826

DOOR HINGE

Augie L. Hansen, Chicago, Ill., assignor to A. L. Hansen Mfg. Co., Chicago, Ill., a corporation of Illinois Application April 23, 1938, Serial No. 203,753

7 Claims. (Cl. 16—163)

This invention relates to improvements in door hinges especially designed for automobile and truck bodies having rounded corners, although not necessarily limited to such use.

The principal object of the invention is to provide an improved, simple and durable hinge that conforms to the rounded corner or supporting member without projecting elbows or similar parts when the door is in closed position, but arranged so that the door can be opened outwardly and swung into position parallel with the side wall, and when returned to closing position parts of the hinge member will automatically assume certain successive angular positions so that the door will close properly in its frame without interference along its hinged edge.

The invention may best be understood by reference to the accompanying drawing, in which:

Fig. 1 is a fragmentary view in perspective showing my improved form of hinge as applied to the rear doors of a commercial automobile truck.

Fig. 2 is an enlarged view showing one of the hinges with the door in closed position.

Fig. 3 is an enlarged detail section taken horizontally through the truck body and door showing the door and one of the hinges in closed position.

Fig. 4 is a view somewhat similar to Fig. 3, but showing the door in fully opened position.

Fig. 5 is an enlarged detail section taken horizontally through the hinge and illustrating the arrangement and operation of the spring restraining means.

Referring now to details of the embodiment of my invention illustrated in the drawing, a pair of hinges indicated generally at 10, 10 are shown as applied to the rear doors 11, 11 of a conventional form of automobile truck body 12. The truck body is of customary streamline design including side walls 13 and curved corner posts 14 adjacent the rear door frame 15 designed to give a rounded and streamlining effect quite common in vehicles of this character.

A base plate 20 curved to fit the corner post 14 is suitably secured adjacent the door frame 15 and is provided with an outwardly bent eye 21 at the outer end thereof which is farthest from the door frame. A link 22 is provided with a pair of eyes 23, 23 at one end thereof hinged to the eye 21 of base plate 20 by a hinge pin 24. The link 22 has a similar pair of eyes 25, 25 at its opposite end registering with an eye 26 forming part of an elongated door plate 27 and hinged to the latter by hinge pin 28.

The arrangement is such that the hinge pin 28 is disposed substantially in alignment with the rabbeted edge 15$^a$ of the door frame 15 when the door and hinge are in fully closed position as shown in full lines in Fig. 3. In the form shown, bearing washers or discs 29, 29 are inserted between the pairs of eyes 23, 23 and eye 21, and similar washers are also inserted between the eyes 25, 25 and the intermediate eye 26 at opposite ends of the link 22.

In the form shown herein, the door plate 27 is made up of a single strap of metal bent upon itself to form the eye 26 previously referred to, and having an intermediate strap of the same vertical dimension interposed between the parallel ends of the first named straps so as to form three parallel plates 30, 31 and 32. These three plates are cut in successively longer lengths, as clearly shown in Figs. 2 and 3, and are suitably fastened to the door 11 by bolts 33, 33. Said straps may also be welded together if desired to form a substantially solid door plate 27.

Referring now to one of the principal features of novelty of my invention, it will be observed that the eye 26 of door plate 27 is formed in outwardly offset relation with respect to said plate, and with an inner surface 26$^a$ adjacent the pivot pin 28 disposed tangentially of the eye and terminating at a shoulder 26$^b$ on the inner surface of the strap 32, as is best shown in Fig. 5. Mounted on the inner face of the link 22 is a spring member 35, herein consisting of two spring metal plates suitably secured as by rivet 36 to the body of the link 22 at a point remote from the hinge pin 28. The outer end of the spring member 35 is curved as indicated at 37 to conform substantially with the normal curvature of the eye 26, and said spring member is normally maintained under substantial spring tension against the curved outer surface of the eye 26.

Due to the spring tension above described, pivotal movement of the door plate 27 with respect to the hinge member 22 will tend to be restrained more than is the case with the hinge connection of the link 22 with respect to the base plate 20. Accordingly it will be understood that in closing the door from its fully opened position shown in Fig. 4, the link will tend to swing upon the pivot pin 24 rather than upon pivot pin 28, with the result that link 22 will normally be moved into its fully closed position as shown in Fig. 3 before the door begins to pivot on pin 28 for closing the door. This movement places the pivot pin 28 in proper position adjacent the door frame before the door itself begins to swing inwardly, so as to avoid any tendency of the inner corner 39 of the door to interfere with the outer corner of the door frame while the door is being closed.

It will be observed further that due to the tangential surface 26ª and co-operating end 37 of the tension spring 35 urged thereagainst, the said surface 26ª forms in effect a cam which causes the end of the spring to be elevated when the door is finally swung into closed position. In other words, the spring 35 normally tends to urge the door and door plate into partially open position with respect to the hinge pin 28 at all times. Thus when the door is even partially closed, as for instance in the dotted line position shown in Fig. 3, the door will pivot bodily with the link 22 in an outward direction about the pivot pin 24, and will not pivot freely about the pivot pin 28 in either direction, and particularly in a direction to close the door from its dotted line position shown in this figure. Thus in closing the door, the latter is maintained at an outwardly inclined angle to the link 22 and swings bodily with said link on pivot pin 24 until the link is swung to closed position; the door then swings on pivot pin 28 under resistance of spring 35, which increases as the end of the spring moves along cam surface 26ª, until the door is fully closed. Thus a positive slamming action is required for closing and locking the door, which feature is particularly desirable with automobile truck doors.

Moreover, when the door is initially unlocked for opening, the spring 35 will automatically tend to "crack" or open the door at a slight angle, so that the inner corner 39 of the door will clear the outer corner of the door frame and thus avoid interference at this point when the door is swung to fully opened position.

Although I have shown and described one particular embodiment of my invention, it will be understood that I do not wish to be limited to the exact construction shown and described, but that various changes and modifications may be made without departing from the spirit and scope of my invention as defined in the appended claims.

I claim as my invention:

1. A hinge for mounting a door adjacent a curved corner, comprising a door plate, a curved base plate, a link curved to conform substantially with said base plate, said link being pivoted at one end to said door plate and at the other end to said base plate so as to overlap the outside of the latter when the hinge is in closed position, and tension means frictionally engaging the pivotal bearing of said door plate to insure more restrained pivotal movement of the latter than that of said base plate relative to said link.

2. A hinge for mounting a door adjacent a curved corner, comprising a door plate, a curved base plate, a link curved to conform substantially with said base plate, said link being pivoted at one end to said door plate and at the other end to said base plate so as to overlap the outside of the latter when the hinge is in closed position, and a leaf spring carried by said link and frictionally engaging the pivotal bearing of said door plate under tension to insure more restrained pivotal movement of the latter than that of said base plate relative to said link.

3. A hinge for mounting a door adjacent a curved corner, comprising a door plate, a curved base plate, a link curved to conform substantially with said base plate, said link being pivoted at one end to said door plate and at the other end to said base plate so as to overlap the outside of the latter when the hinge is in closed position, and a curved leaf spring mounted on the under face of said link with its free end frictionally engaging the pivotal bearing of said door plate under tension to insure more restrained pivotal movement of the latter than that of said base plate relative to said link.

4. A hinge for mounting a door adjacent a curved corner, comprising a curved base plate, a curved link hinged at one end to said base plate, a door plate having an eye pivoted to the opposite end of said link, said eye having a cam surface on its inner side, and a leaf spring mounted on the inner face of said link having its free end engaging said cam surface so as to restrain pivotal movement of said door plate under increasing tension as the latter is positively swung through its final closing movement relative to said link.

5. A hinge for mounting a door adjacent a curved corner, comprising a curved base plate, a curved link hinged at one end to said base plate, a door plate having an eye pivoted to the opposite end of said link, said eye having a cam surface on its inner side, and a leaf spring mounted on the inner face of said link having its free end engaging said cam surface so as to restrain pivotal movement of said door plate under increasing tension as the latter is positively swung through its final closing movement relative to said link, and said spring and cam surface co-operating to urge said door plate into partially open position relative to said link when positive closing pressure on said door plate is released.

6. A hinge for mounting a door adjacent a curved corner, comprising a door plate, a curved base plate, a link curved to conform substantially to said base plate, said link being pivoted at one end to said door plate and at the other end to said base plate so as to overlap the outside of the latter when the hinge is in closed position, a cam mounted on and concentric with the pivotal connection between said door plate and said link, and a spring mounted on said two last named members and engaging said cam so as to restrain pivotal movement of said door plate under increasing tension as the latter is positively swung through its final closing movement relative to said link.

7. A hinge for mounting a door adjacent a curved corner, comprising a door plate, a curved base plate, a link curved to conform substantially to said base plate, said link being pivoted at one end to said door plate and at the other end to said base plate so as to overlap the outside of the latter when the hinge is in closed position, a cam mounted on and concentric with the pivotal connection between said door plate and said link, a spring mounted on said two last named members and engaging said cam so as to restrain pivotal movement of said door plate under increasing tension as the latter is positively swung through its final closing movement relative to said link, and said spring and cam surface co-operating to urge said door plate into partially open position relative to said link when positive closing pressure on said door plate is released.

AUGIE L. HANSEN.